US012632952B2

(12) United States Patent   (10) Patent No.: US 12,632,952 B2
Grember   (45) Date of Patent: May 19, 2026

(54) METHOD AND ELECTRONIC DEVICE FOR ASSISTING WITH SURVEILLANCE OF AN ELEMENT OF A NUCLEAR REACTOR, ASSOCIATED COMPUTER AND ASSOCIATED SYSTEM

(71) Applicant: FRAMATOME, Courbevoie (FR)

(72) Inventor: Franck Grember, Lyons (FR)

(73) Assignee: FRAMATOME, Courbevoie (FR)

( * ) Notice: Subject to any disclaimer, the term of this patent is extended or adjusted under 35 U.S.C. 154(b) by 329 days.

(21) Appl. No.: 18/037,560

(22) PCT Filed: Nov. 18, 2021

(86) PCT No.: PCT/EP2021/082076
§ 371 (c)(1),
(2) Date: May 17, 2023

(87) PCT Pub. No.: WO2022/106506
PCT Pub. Date: May 27, 2022

(65) Prior Publication Data
US 2024/0006087 A1    Jan. 4, 2024

(30) Foreign Application Priority Data
Nov. 19, 2020    (FR) ..................................... 20 11882

(51) Int. Cl.
*G05B 9/00*        (2006.01)
*G06T 7/00*        (2017.01)
(Continued)

(52) U.S. Cl.
CPC .... *G06T 7/001* (2013.01); *G06T 2207/20081* (2013.01); *G06T 2207/20084* (2013.01); *G06T 2207/30164* (2013.01); *G21C 17/08* (2013.01)

(58) Field of Classification Search
USPC ................. 382/141–225; 700/17–55, 79–80, 700/108–111, 286–306; 706/900–907,
(Continued)

(56) References Cited

U.S. PATENT DOCUMENTS 9,547,328 B2 * 1/2017 Kakunda ................ G21D 3/001
11,676,257 B2 * 6/2023 Wen ....................... G06T 7/0004
382/141

(Continued)

FOREIGN PATENT DOCUMENTS

CN      108280820 A      7/2018
CN      108734142 A      11/2018
CN      110751642 A      2/2020

OTHER PUBLICATIONS

Gao, Hong-li; A Nuclear Component Surface Roughness Evaluation Method Based on Convolution Neural Network of; 2018 (Year: 2018).*

(Continued)

*Primary Examiner* — Marcellus J Augustin
(74) *Attorney, Agent, or Firm* — Davidson Kappel LLC

(57)            ABSTRACT
A method for assisting with surveillance of an element of a nuclear reactor, said method being implemented by an electronic device, comprising the steps of training an artificial-intelligence algorithm; acquiring an image of the element; estimating, on the basis of the image and via the artificial-intelligence algorithm, whether a fault is present in the element; displaying the image of the element; and if at least one fault is estimated to be present, generating an alarm. In the estimating step, an input to the artificial-intelligence algorithm is an image of a region comprising the element, and an output is a level of confidence as regards an absence of fault in the element for said region. If the level of confidence is lower than a threshold, then a fault is
(Continued)

estimated to be present. In the training step, only images of fault-free elements are inputted into the artificial-intelligence algorithm.

15 Claims, 8 Drawing Sheets

(51) Int. Cl.
    *G21C 17/00*      (2006.01)
    *G21C 17/003*    (2006.01)
    *G21C 17/02*      (2006.01)
    *G21C 17/06*      (2006.01)
    G21C 17/08      (2006.01)

(58) Field of Classification Search
    USPC ........................................................ 706/1–62
    See application file for complete search history.

(56) References Cited

U.S. PATENT DOCUMENTS

2004/0002776 A1* 1/2004 Bickford ............ G05B 23/0254
                                                     700/52
2016/0078353 A1    3/2016 Shen et al.

2017/0343481 A1* 11/2017 Jahanshahi ............ G06N 20/00
2019/0164270 A1    5/2019 Wardell et al.
2020/0349695 A1* 11/2020 Horita .................... H04N 23/63
2020/0349874 A1* 11/2020 Mills .................... G02B 27/017
2021/0174492 A1* 6/2021 Karaaslan ................ G06T 7/11
2023/0094389 A1* 3/2023 You .......................... G06N 5/01
                                                     706/62

OTHER PUBLICATIONS

Bhattacharyya Bhaskar; Near Real-Time Detection and Classification of Machine Anomalies Using Machine Learning and Artificial Intelligence; 2020 (Year: 2020).*
Liu, Feng; A Colour Description Based On Sparse Expression And Circular-like Fruit Defect Detection Method; 2019 (Year: 2019).*
International Search Report for PCT/EP2021/082076.
French Search Report for FR2011882.
Aditya Krishna Menon et al.: "Anomaly Detection Using One-Class Neural Networks," pp. 1-13.

* cited by examiner

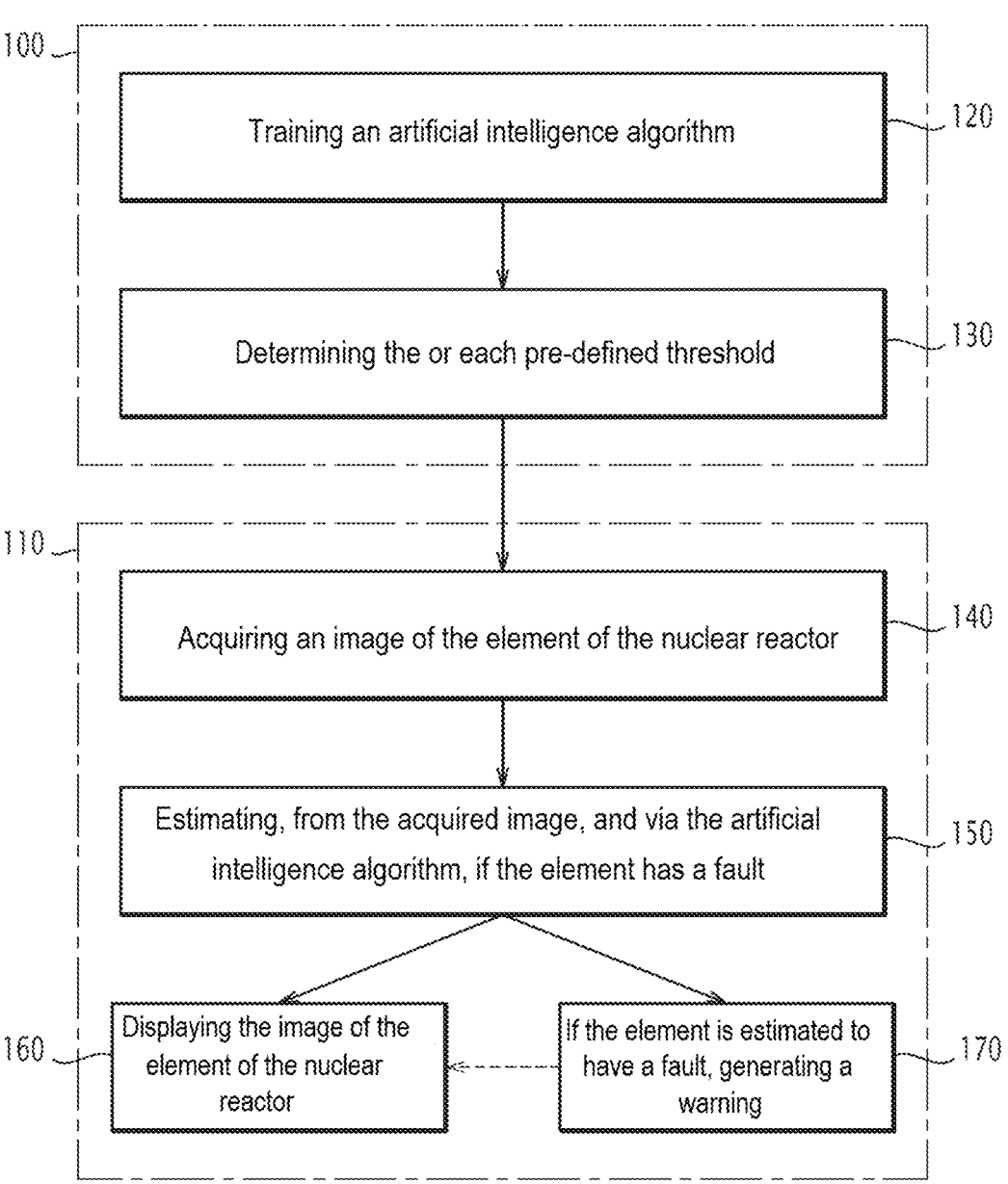

100

Training an artificial intelligence algorithm — 120

Determining the or each pre-defined threshold — 130

110

Acquiring an image of the element of the nuclear reactor — 140

Estimating, from the acquired image, and via the artificial intelligence algorithm, if the element has a fault — 150

160 — Displaying the image of the element of the nuclear reactor

If the element is estimated to have a fault, generating a warning — 170

FIG.4

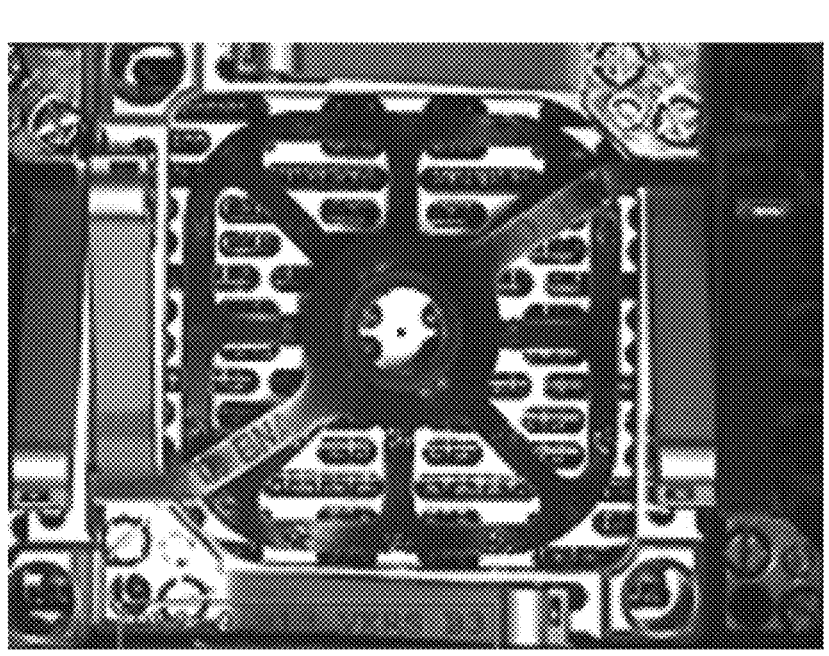
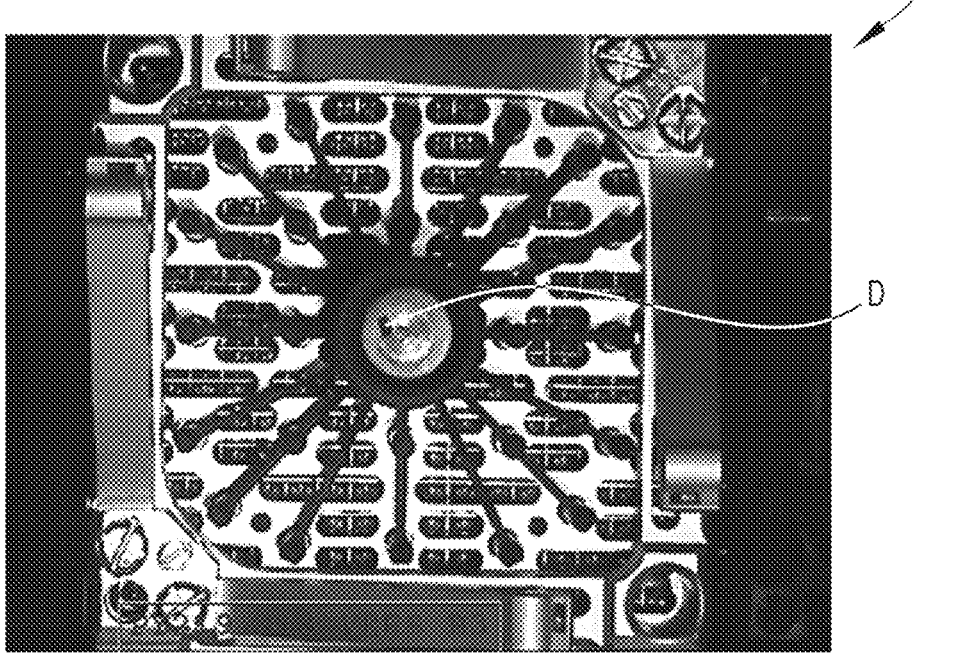
FIG.5

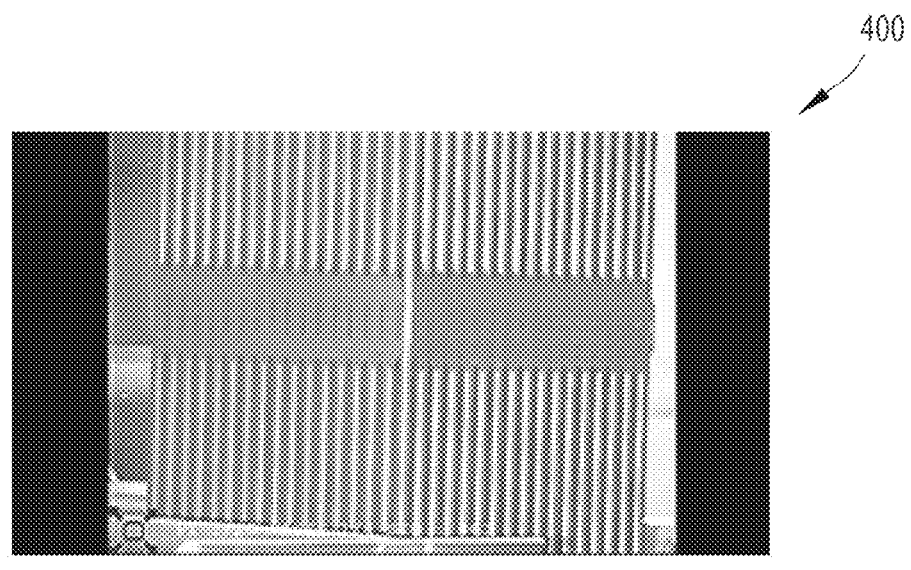
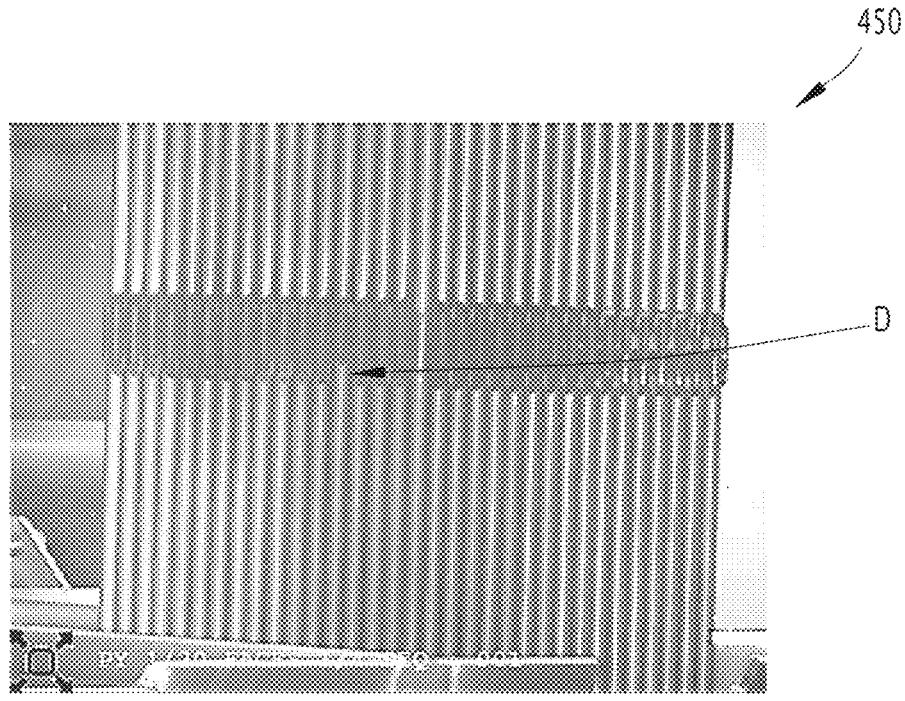
FIG.7

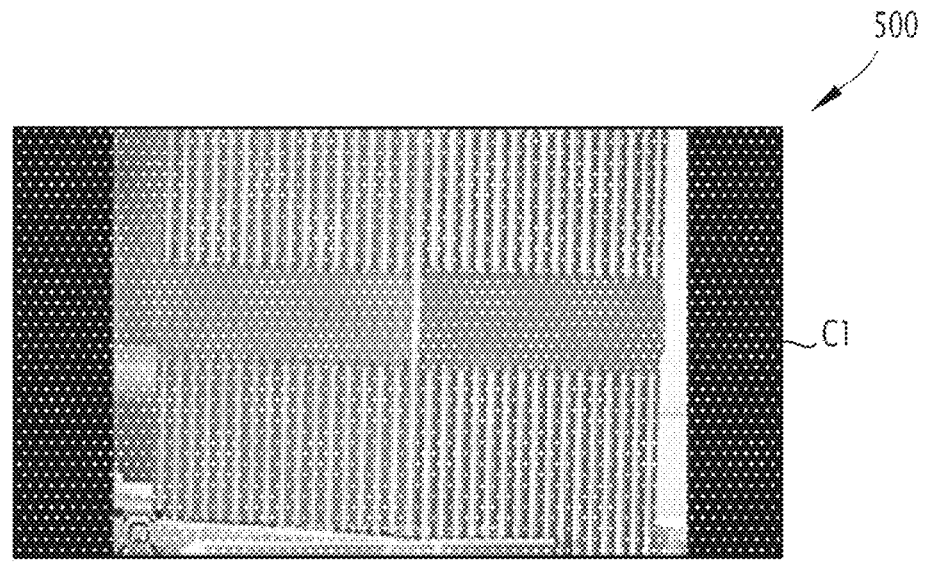
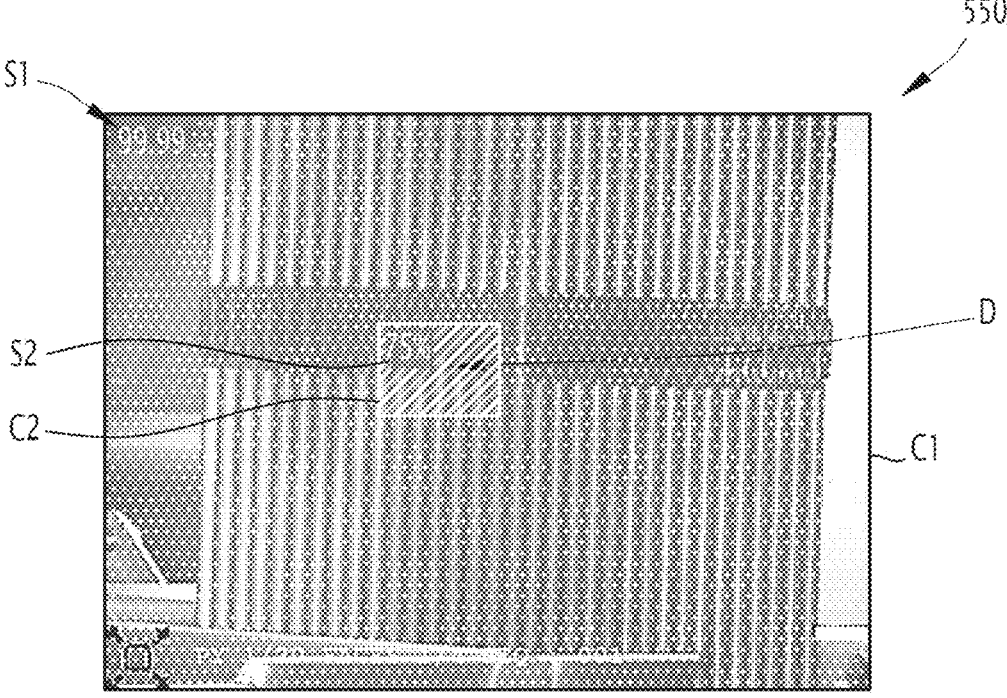
FIG.8

METHOD AND ELECTRONIC DEVICE FOR ASSISTING WITH SURVEILLANCE OF AN ELEMENT OF A NUCLEAR REACTOR, ASSOCIATED COMPUTER AND ASSOCIATED SYSTEM

The present disclosure relates to a method for assisting the surveillance of an element of a nuclear reactor, the method being implemented by an electronic device.

BACKGROUND

The present disclosure further relates to a computer program including software instructions which, when executed by a computer, implement such a method for assisting with surveillance.

The present disclosure further relates to an electronic device for assisting with surveillance, as well as an electronic system for assisting with the surveillance of an element of a nuclear reactor, comprising an image sensor configured for taking at least one image of the element of a nuclear reactor, and such a device for assisting with surveillance, connected to the image sensor.

The present disclosure then relates to the field of surveillance of nuclear reactors, in order to increase the operational safety of the reactors and to limit the risks of incidents. The present disclosure relates in particular to the surveillance of nuclear reactors using artificial intelligence algorithms, in order to facilitate the surveillance by operators, and in particular to reduce the cognitive load of the operators.

Document U.S. 2017/0343481 A1 discloses a method for remote inspection of components of a nuclear power plant, in particular for detecting surface cracks. The above document specifies that the use of automated crack detection algorithms improves the speed of examinations and reduces the risk of human error, and that most existing automatic crack detection algorithms are based on edge detection, thresholding or again morphological operations. The document then presents a machine learning classifier configured for analyzing surface texture data and for detecting features of surface texture in zones of the surface shown on images, with the ability to track the motion of surface texture features detected on the images, so as to produce tracking data. The classifier is typically a Support Vector Machine, also denoted by SVM. The classifier is then apt to predict an appropriate label, such as "cracked" or "non-cracked", for the detected features of surface texture.

However, such a process requires a particularly complex learning for the classifier, since the classifier was trained by manually cropping 4153 non-cracked images (which did not contain cracks) and 611 cracked images (which contained a crack), some crack images having further been subject to a rotation of 22.5°, 45° or 76.5°, in order to train the classifier to detect cracks according to different orientations.

SUMMARY

A goal of the present disclosure is then to propose a method for assisting with the surveillance of an element of a nuclear reactor, which would be easier to implement, in particular during the training of the artificial intelligence algorithm.

To this end, the subject matter of the present disclosure is a method for assisting with the surveillance of an element of a nuclear reactor, the method being implemented by an electronic device and comprising the following steps:

training an artificial intelligence algorithm;

acquiring an image of the element of the nuclear reactor;

estimating, from the acquired image and via the artificial intelligence algorithm, the presence of at least one fault of the element;

displaying the image of the element of the nuclear reactor; and if at least one fault is estimated to be present, generating a warning;

during the estimation step, an input to the artificial intelligence algorithm is an image of a zone containing the element of the nuclear reactor, and an output of the artificial intelligence algorithm is a level of confidence that the element is free of faults for said zone;

if the level of confidence is below a predefined threshold, then at least one fault is estimated to be present; and during the training step, only images of the fault-free element are provided to the input of the artificial intelligence algorithm.

Thereby, with the method for assisting with surveillance according to the present disclosure, the artificial intelligence algorithm can directly provide a level of confidence as to the absence of a fault of the element of the nuclear reactor for each zone an image of which has been provided as input to the artificial intelligence algorithm. The presence or absence of a fault for the element of the nuclear reactor is then estimated directly from the computed level of confidence, and a fault is estimated to be present if the level of confidence is below the predefined threshold.

Furthermore, according to the present disclosure, the artificial intelligence algorithm is trained exclusively on the basis of images of the element of the nuclear reactor without any fault, i.e. images where the element has no fault.

Such learning then makes it possible to dispense with a library of faults, which is particularly interesting in the case of an element of a nuclear reactor, for which faults are relatively rare.

Moreover, such a method for assisting with surveillance remains effective even for faults that have not yet been identified. Indeed, the method for assisting with surveillance aims to determine, the zones which do not present faults, via the artificial intelligence algorithm and with the greatest possible precision, and to generate a warning when a fault is estimated to be present for a given zone. The above allows the operator in charge of surveillance to focus mainly on the suspect zone or zones, in order to detect possible faults more easily.

The warning is e.g. a visual warning, with an overlay of specific color displayed superimposed on the image of the questionable zone, such as a red overlay meant to attract the attention of the operator; and/or an audible warning, typically synchronized with the display of the questionable zone.

According to other advantageous aspects of the present disclosure, the method for assisting with surveillance comprises one or a plurality of the following features, taken individually or according to all technically possible combinations:

the artificial intelligence algorithm includes a network of artificial neurons;

the element of the nuclear reactor is an element of a primary circuit of the nuclear reactor;

the element of the nuclear reactor is preferentially selected from the group consisting of: a part of the nuclear reactor core, a part of a set of fuel assembly/ assemblies, and a part of the nuclear reactor vessel;

a first warning is generated if the level of confidence is lower than a first predefined threshold and/or a second warning is generated if the level of confidence is lower than a second predefined threshold, the second warning being higher than the first warning, and the second predefined threshold being strictly lower than the first predefined threshold;

the acquired image includes a plurality of distinct zones, and during the estimation step, a respective level of confidence is estimated for each of said zones;

the method further comprises a step of determining the or each predefined threshold, distinct from the training step, during the determination step, the or each predefined threshold is preferentially determined according to at least one level of confidence computed by the artificial intelligence algorithm and for an image of said element with a fault;

the warning is a visual warning;

the visual warning is preferentially in the form of an overlay and/or a symbol intended for being displayed superimposed on the image of the element of nuclear reactor; and the warning is an audible warning.

A further subject matter of the present disclosure relates to a computer program including software instructions which, when executed by a computer, implement a method for assisting with surveillance, as defined hereinabove.

A further subject matter of the present disclosure relates to an electronic device for assisting the surveillance of an element of a nuclear reactor, the device comprising:

a training module configured for training an artificial intelligence algorithm;

an acquisition module configured for acquiring an image of the element of the nuclear reactor;

an estimation module configured for estimating, from the acquired image and via the artificial intelligence algorithm, the presence of at least one fault on the element;

a display module configured for displaying the image of the element of the nuclear reactor; and a generation module configured for generating a warning if at least one fault is estimated to be present;

an input from the artificial intelligence algorithm being an image of a zone containing the element of nuclear reactor, and an output from the artificial intelligence algorithm being a level of confidence with regard to the absence of fault on the element in said zone;

the estimation module being configured for estimating that at least one fault is present, if the level of confidence is below a predefined threshold; and the training module being, for the training of the artificial intelligence algorithm, configured for providing, to the input of said artificial intelligence algorithm, only images of the element without any fault.

A further subject matter of the present disclosure relates to an electronic system for assisting the surveillance of an element of a nuclear reactor, the system comprising:

an image sensor configured for taking at least one image of the element of the nuclear reactor; and an electronic device for assisting with the surveillance of the element of the nuclear reactor, connected to the image sensor; the device being as defined hereinabove.

BRIEF DESCRIPTION OF THE DRAWINGS

Such features and advantages of the present disclosure will become clearer upon reading the following description, given only as a non-limiting example, and made with reference to the enclosed drawings, wherein:

FIG. 4 is an organization chart for a method according to the present disclosure, for assisting with surveillance of the element of the nuclear reactor shown in FIG. 1, the method being implemented by the electronic device shown in FIG. 3;

FIG. 5 is an example of two images taken by the image sensor shown in FIG. 3, a first image representing the element without any fault, and a second image representing the element with a fault;

FIG. 7 is a view similar to the view shown in FIG. 5 for another element of the nuclear reactor shown in FIG. 1;

FIG. 8 is a view similar to the view shown in FIG. 6 for said other element.

DETAILED DESCRIPTION

Figure 1:
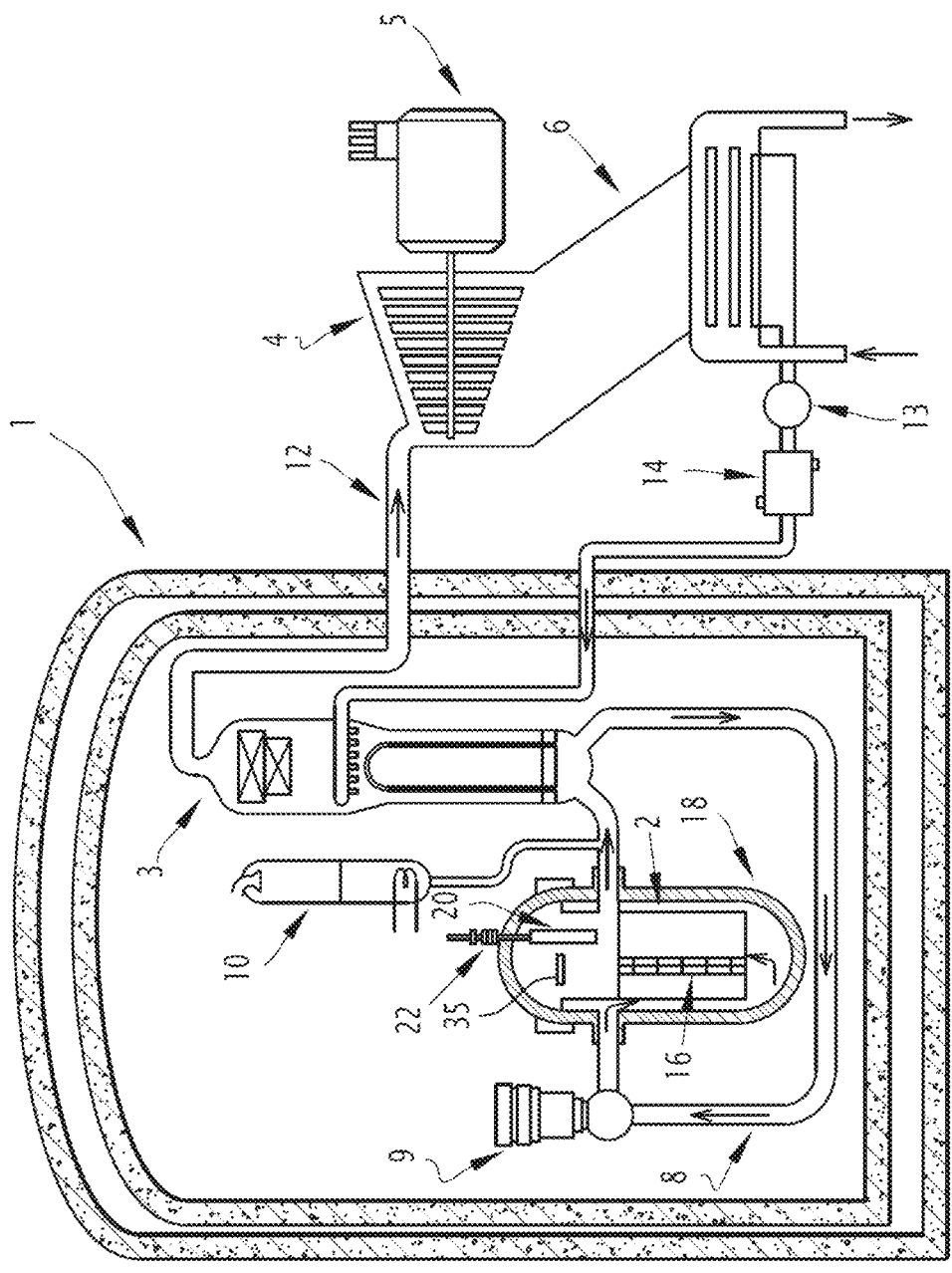
FIG. 1 is a schematic view illustrating a nuclear reactor, such as a pressurized water nuclear reactor.

In FIG. 1, a pressurized water nuclear reactor 1 comprises, as is known per se, a core 2, a steam generator 3, a turbine 4 coupled to an electric power generator 5, and a condenser 6.

The nuclear reactor 1 comprises a primary circuit 8 equipped with a pump 9 and wherein pressurized water flows, along the path shown by the arrows in FIG. 1. The water rises in particular through the core 2 to be reheated therein, ensuring the cooling of the core 2.

The primary circuit 8 further comprises a pressurizer 10 used for pressurizing the water circulating in the primary circuit 8.

The water from the primary circuit 8 also supplies the steam generator 3 where the water is cooled while providing the vaporization of water circulating in a secondary circuit 12.

The steam produced by the steam generator 3 is channeled by the secondary circuit 12 to the turbine 4 and then to the condenser 6 where the steam is condensed by indirect heat exchange with the cooling water circulating through the condenser 6.

The secondary circuit 12 comprises, downstream of the condenser 6, a pump 13 and a heater 14.

Conventionally, the core 2 comprises fuel assemblies 16 which are loaded into a vessel 18 according to a loading schedule. A single assembly 16 is shown in FIG. 1, but the core 2 comprises e.g. 157 assemblies 16.

The reactor 1 comprises control clusters 20 which are arranged in the vessel 18 above certain fuel assemblies 16. Only one control cluster 20 is shown in FIG. 1, but the core 2 comprises e.g. sixty control clusters 20.

The control clusters 20 can be moved by mechanisms 22 so as to be inserted into the fuel assemblies 16 which the mechanisms overhang. Conventionally, each control cluster 20 comprises rods, and certain of the rods thereof include a neutron-absorbing material. Thus, the vertical displacement of each control cluster 20 is used for adjusting the reactivity of the reactor 1 and authorizes variations in the overall power supplied by the core 2, according to the penetration of the control clusters 20 into the fuel assemblies 16.

Figure 2:
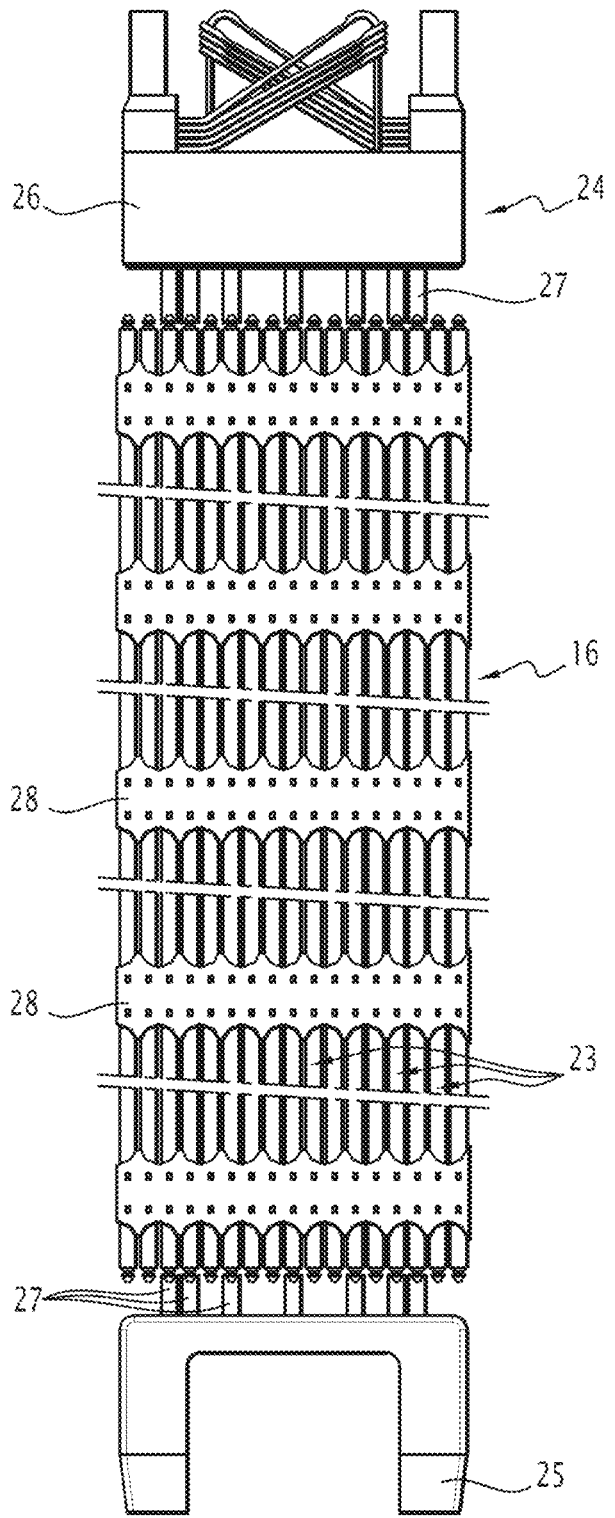
FIG. 2 is a schematic view of a fuel assembly of the reactor core shown in FIG. 1.

As illustrated in FIG. 2, each fuel assembly 16 comprises, conventionally, an array of fuel rods 23 and a skeleton assembly 24 for supporting the fuel rods 23.

The skeleton assembly 24 conventionally comprises a lower end-piece 25, an upper end-piece 26, a system of guide tubes 27 connecting the two end-pieces 25 and 26 and intended for receiving the rods of the control clusters 20 and for positioning grids 28 forming spacers for positioning the arrays of the fuel rods 23 and the system of guide tubes 27.

Figure 3:
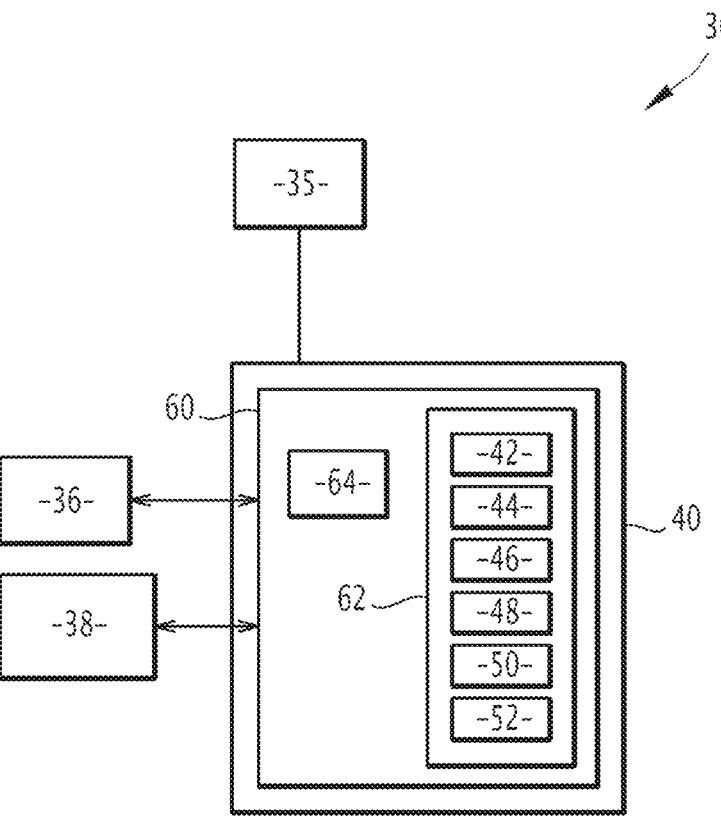
FIG. 3 is a schematic representation of an electronic system, according to the present disclosure, for assisting with the surveillance of an element of the nuclear reactor shown in FIG. 1, the system for assisting with surveillance comprising an image sensor apt to take at least one image of said element, and an electronic device for assisting with surveillance, connected to the image sensor.

In FIG. 3, an electronic system 30 for assisting with the surveillance of an element of the nuclear reactor 1 comprises a sensor 35 for image(s) of the element of the nuclear reactor, input/output means 36 and a display screen 38.

The system for assisting with surveillance 30 further comprises an electronic device 40 for assisting with the surveillance the element of the nuclear reactor, said device 40 being connected to the image sensor 35, to the input/output means 36 and to the display screen 38.

The element of the nuclear reactor apt to be monitored via the system for assisting with surveillance 30, and in particular the device for assisting with surveillance 40, is typically an element of the primary circuit 8. The element of nuclear reactor apt to be monitored is e.g. chosen from the group consisting of: a part of the core 2 of the nuclear reactor 1, a part of a set of fuel assemblies 16, and a part of the vessel 18 of the nuclear reactor 1.

The image sensor 35 is then arranged e.g. inside the vessel 18, in order to take images of the fuel assemblies 16, or yet of one or a plurality of internal parts of the vessel 18.

The image sensor 35 is typically arranged on a tool such as e.g. a robot carrier, a submarine carrier; or on a rod; or on a machine for loading fuel from the fuel assemblies 16.

The image sensor 35 is then generally configured for carrying out an in-situ remote visual inspection of an element of the nuclear reactor 1, in particular of the primary circuit 8 thereof.

The image sensor 35 is then configured for taking at least one image of the element of the nuclear reactor. The image sensor 35 is known per se.

The device for assisting with surveillance 40 comprises a module 42 for acquiring an image of the element of the nuclear reactor; a module 44 for estimating, from the acquired image and via an artificial intelligence algorithm, the presence of at least one fault of the element; a module 46 for displaying the image of the element of the nuclear reactor; and a module 48 for generating a warning if at least one fault is estimated to be present.

The device for assisting with surveillance 40 also comprises a module 50 for training the artificial intelligence algorithm.

As an optional addition, the device for assisting with surveillance 40 comprises a module 52 for determining a predefined threshold, used for estimating the presence of at least one fault on the element.

In the example shown in FIG. 3, the electronic device for assisting with surveillance 40 comprises an information processing unit 60 consisting e.g. of a memory 62 and of a processor 64 associated with the memory 62.

In the example shown in FIG. 3, the acquisition module 42, the estimation module 44, the display module 58 and the training module 50, and, as an optional addition, the determination module 52 are each produced in the form of a software program, or of a software brick, which can be executed by the processor 64. The memory 62 of the device for assisting with surveillance 40 is then apt to store a software for acquiring an image of the element of the nuclear reactor; a software for estimating, from an acquired image and via the artificial intelligence algorithm, the presence of at least one fault on the element; a software for displaying the image of the element of the nuclear reactor; a software for generating the warning if at least one fault is estimated to be present; and a software for training the artificial intelligence algorithm. As an optional addition, the memory 62 of the electronic device for assisting with surveillance 40 is also apt to store a software for determining the or each predefined threshold. The processor 64 is then apt to execute each of the software programs among the acquisition software program, the estimation software program and the generation software program and the training software program, as well as, as an optional addition, the determination program.

In a variant (not shown), the acquisition module 42, the estimation module 44, the display module 46, the generation module 48 and the training module 50, as well as, as an optional addition, the determination module 52, are each produced in the form of a programmable logic component, such as an FPGA (Field Programmable Gate Array), or further in the form of a dedicated integrated circuit, such as an ASIC (Application-Specific Integrated Circuit).

When the electronic device for assisting with surveillance 40 is produced in the form of one or a plurality of software programs, i.e. in the form of a computer program, same is further apt for being recorded on a computer-readable medium (not shown). The computer-readable medium is e.g. a medium apt to store electronic instructions and to be coupled to a bus of a computer system. As an example, the readable medium is an optical disk, a magneto disk, a ROM memory, a RAM memory, any type of non-volatile memory (e.g. EPROM, EEPROM, FLASH, NVRAM), a magnetic card or an optical card. A computer program containing software instructions is then stored on the readable medium.

The acquisition module 42 is configured for acquiring at least one image of the element of the nuclear reactor from the image sensor 35, said element being e.g. a part of the core 2, a part of the set of fuel assemblies 16, or again a part of the vessel 18.

The acquisition module 42 is preferentially configured for acquiring successive images of said element of the nuclear reactor 1, and to then progressively sent the images to the estimation module 44.

The estimation module 44 is configured for estimating, from each respective acquired image and via the artificial intelligence algorithm, the presence of at least one fault of the element; i.e. configured for estimating whether said element is likely to have at least one fault.

According to the present disclosure, an input to the artificial intelligence algorithm is an image of a zone containing the element of the nuclear reactor, and an output of the artificial intelligence algorithm is a level of confidence with regard to the absence of a fault of the element for said zone, i.e. a level of confidence that the element has no fault for said zone.

The estimation module 44 is then configured for estimating that at least one fault is present when the level of confidence is below the predefined threshold. In other words, if the level of confidence provided at the output of the artificial intelligence algorithm is less than said predefined threshold, then the estimation module 44 is configured for estimating the presence of at least one fault. As a corollary, the estimation module 44 is configured for estimating the absence of fault of the element for said zone, if the level of confidence is greater than or equal to said predefined threshold.

In addition, when the acquisition module 42 is configured for acquiring successive images of the element considered, then for successively sending the images to the estimation module 44, the estimation module 44 is configured for estimating successively, from each respective image and via the artificial intelligence algorithm, the presence of at least one fault of the element for each respective image, the artificial intelligence algorithm providing a level of confidence with regard to the absence of fault for each respective image.

As an optional addition, the acquired image includes a plurality of distinct zones, and the estimation module 44 is then configured for calculating a respective level of confidence for each of said zones.

According to the optional addition, the estimation module 44 is configured e.g. for cropping the acquired image into a plurality of cropped images, each cropped image corresponding to a respective zone and to then supply as input to the artificial intelligence algorithm, each cropped image corresponding to a respective zone, and recovering at the output of the artificial intelligence algorithm, a level of confidence associated with each cropped image, i.e. corresponding to each respective zone. In this way it is possible to display a distinct level of confidence for each of the zones, as can be seen in the example shown in FIG. 6.

The artificial intelligence algorithm is typically an auto-encoder algorithm, or an algorithm based on artificial neural network(s), such as an unsupervised learning algorithm based on artificial neural network(s).

The artificial intelligence algorithm includes e.g. an artificial neural network, such as a multioverlay network with backpropagation. The artificial intelligence algorithm is preferentially said artificial neural network.

The display module 46 is configured for displaying the image of the element, e.g. on the display screen 38.

In addition, when a respective warning is generated by the generation module 48 and said warning is a visual warning, the display module 46 is further configured for displaying said visual warning, e.g. also on the display screen 38.

The generation module 48 is configured for generating a respective warning if at least one fault is estimated to be present. In other words, if the estimation module 44 has estimated the presence of at least one fault on the element, then the generation module 48 is configured for generating a warning corresponding to the estimation of the presence of at least one fault. In particular, if the level of confidence with regard to the absence of a fault for a respective zone is computed below the predefined threshold, then the generation module 48 is configured for generating a warning for said zone.

As an optional addition, the generation module 48 is configured for generating a first warning if the level of confidence is below a first predefined threshold and/or a second warning if the level of confidence is below a second predefined threshold, the second warning being greater than the first warning, i.e. having an intensity greater than an intensity of the first warning, and the second predefined threshold being strictly lower than the first predefined threshold.

The warning, or each warning in the case of first and second warnings, is e.g. a visual warning. According to the present example, the visual warning is preferentially in the form of a colored overlay, such as the overlay C2 visible in FIG. 6, and/or of a symbol, such as the symbol S2 which is also visible in FIG. 6. The visual warning is typically intended for being displayed superimposed on the image of the element of the nuclear reactor.

According to the aforementioned addition with the first and second warnings, the second visual warning has a sharper tonality than the first visual warning, so as draw the operators attention more to the second warning than to the first warning.

In a variant, the warning generated by the generation module 48 is an audible warning. According to such variant, the second audible warning has greater intensity than the intensity of the first audible warning. The second audible warning then typically has a sound level higher than the sound level of the first audible warning and/or a frequency higher than the frequency of the first audible warning so as to have a more acute tonality, and thereby to attract the operator's attention more.

The training module 50 is configured for training the artificial intelligence algorithm used by the estimation module 44. In particular, the training module 50 is configured for providing input data and corresponding output data to the artificial intelligence algorithm, for training the algorithm.

According to the present disclosure, for training the artificial intelligence algorithm, the training module 50 is configured for providing only images of the element without any defect to the input of said artificial intelligence algorithm. In other words, the training module 50 is configured for training said artificial intelligence algorithm in recognizing, with very high precision, the images of the element without any defect, and then in assigning to such images a level of confidence close to 100%, such as a level of confidence greater than 95%, and more preferentially yet greater than 99%.

As an optional addition, the determination module 52 is configured for determining the or each predefined threshold and is distinct from the training module 50.

The determination module 52 is e.g. configured for determining the predefined threshold, or further each predefined threshold in the case of the first and second predefined thresholds, as a function of at least one level of confidence computed by the artificial intelligence algorithm and for an image of said element with a fault. In other words, the determination module 52 is configured for obtaining, via the estimation module 44, at least one level of confidence corresponding to the presence of a fault on the corresponding element, and then for determining the or each threshold from the level of confidence in the presence of a fault.

The determination module 52 is configured e.g. for determining the predefined threshold as being equal to a mean value between the level of confidence obtained for said element in the presence of a fault and the level of confidence equal to 100% corresponding to a definite absence of any fault.

When the determination module 52 is configured for determining the first and the second predefined thresholds, the first predefined threshold is e.g. equal to a first weighted average between the level of confidence obtained for the element in the presence of a defect and the level of confidence equal to 100% corresponding to the definite absence of a defect; and the second predefined threshold is determined with a second weighted average also between said level of confidence in the presence of a defect, and the level of confidence equal to 100% in the absence of any defect, and the weighting coefficient associated with the level of confidence in the presence of a defect being for the second weighted average, greater than the level of confidence used for the first weighted average.

The operation of the system for assisting with surveillance 30, and in particular of the device for assisting with surveillance 40, will now be described with reference to FIG. 4 which represents a flow chart of the method for assisting with the surveillance of an element of the nuclear reactor 1, the method being implemented by the electronic device for assisting with surveillance 40.

The method of assisting with surveillance comprises an initial phase 100, followed by an operational phase 110 during which the surveillance is performed for one or a plurality of successive acquired images.

The initial phase 100 comprises a training step 120 during which the training module 50 trains the artificial intelligence algorithm to compute a level of confidence with regard to the absence of any fault of the element, for different images corresponding to different zones including the element of the nuclear reactor.

According to the present disclosure, during the training step 120, only images of the element without any fault are supplied, by the training module 50, to the input of the artificial intelligence algorithm, with then a corresponding level of confidence close to 100%, such as a level of confidence greater than 99%.

At the end of the learning step 120, the determination module 52 determines, in a subsequent step 130 and distinct from the training step 120, the predefined threshold in the case where only one predefined threshold is used, or each predefined threshold in the case of the first and second predefined thresholds. During the determination step 130, the determination module 52 determines e.g. the or each predefined threshold according to at least one level of confidence computed by the artificial intelligence algorithm and for an image of said element with a fault, as described hereinabove.

At the end of the initial phase 100, the method for assisting with surveillance comprises the operational phase 110 which includes first a step 140 of acquiring an image of the element of the nuclear reactor 1 by means of the acquisition module 42. The acquisition module 42 typically acquires the image from the image sensor(s) 35 which regularly takes images of said element.

The method for assisting with surveillance then moves to the next step 150, during which the estimation module 44 estimates, from the acquired image and via the artificial intelligence algorithm previously trained, the presence of at least one fault for the element of the nuclear reactor 1, shown on the acquired image.

During the estimation step 150, the acquired image represents in particular a zone which includes the element of the nuclear reactor, and the estimation module 44 then computes, via the artificial intelligence algorithm, a level of confidence with regard to the absence of fault of the element for said zone and then estimates whether any fault(s) is (are) present, according to the computed level of confidence. Typically, if the level of confidence is lower than the predefined threshold, or else than one of the first and second predefined thresholds, then the estimation module 44 estimates that at least one fault is present for said zone.

As an optional addition, when the acquired image includes a plurality of distinct zones, the estimation module 44 computes a respective level of confidence for each of said zones, and then estimates whether at least one fault is present on the element for each of said zones.

The device for assisting with surveillance 40 then displays, during the step 160 and via the display module 46 thereof, the image of the element of the nuclear reactor 1.

In parallel, or even prior to the display step 160, the device for assisting with surveillance 40 generates, during the step 170, via the generation module 48 thereof and if at least one fault is estimated to be present, a corresponding warning for at least one fault estimated to be present.

The warning is typically a visual warning, such as the colored overlay C2 and/or the symbol S2 and is then displayed superimposed on the image of the element of the nuclear reactor 1 during the display step 160.

In a variant or in addition, the warning is an audible warning, which is preferentially emitted at the same time as the display of the image of the corresponding element of the nuclear reactor 1 during the step 160.

Figure 6:
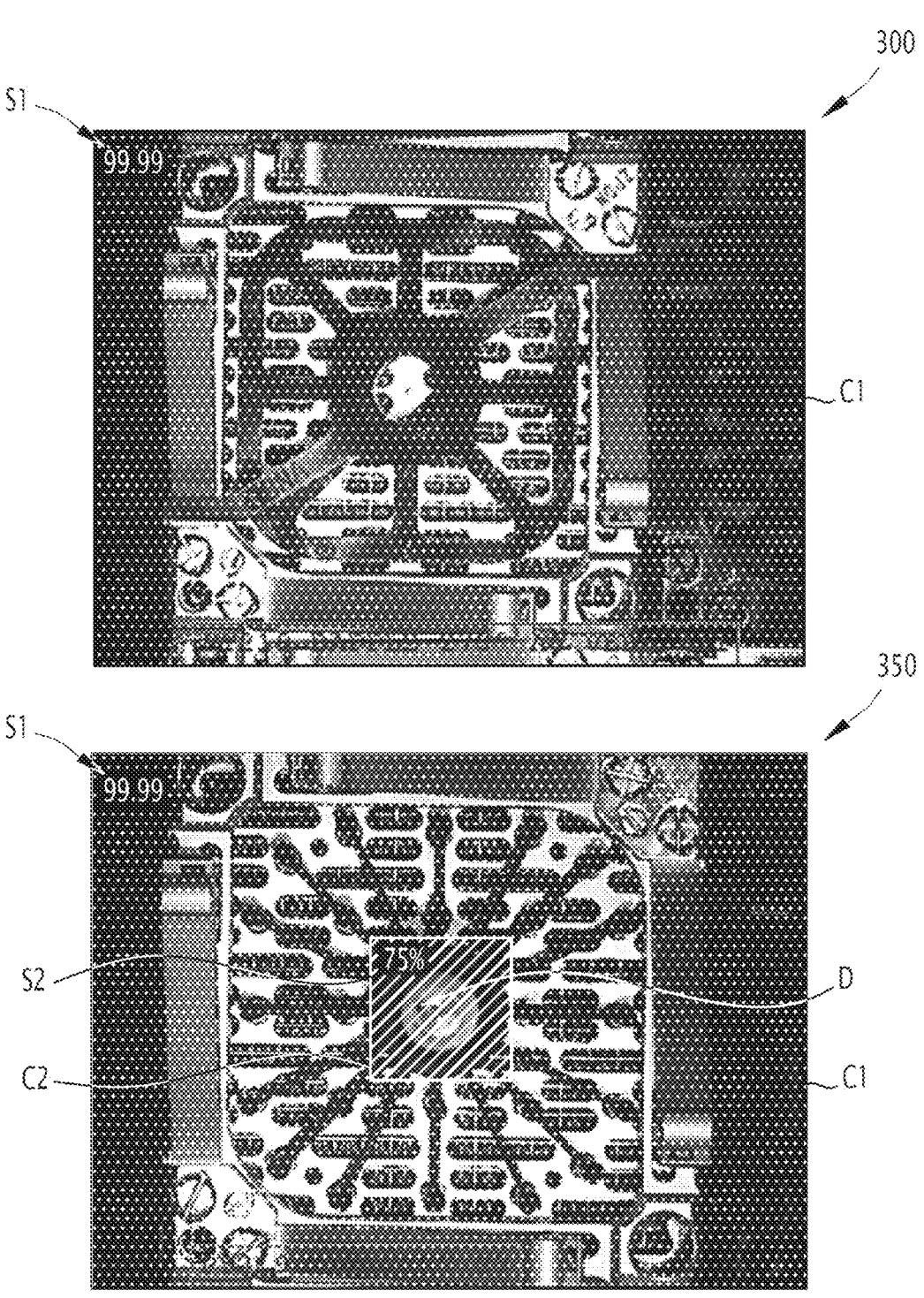
FIG. 6 is a schematic representation of the images which can be displayed by the device for assisting with surveillance shown in FIG. 3, following the implementation of the method shown in FIG. 4 and on the basis of the images shown in FIG. 5.

In the example shown in FIGS. 5 and 6, the element of the nuclear reactor 1 is a part of the core 2 of said nuclear reactor 1, and FIG. 5 shows two acquired images, namely a first acquired image 200 showing no faults, and a second image 250 showing a fault D.

FIG. 6 then shows the images as displayed during the display step 160, namely a first displayed image 300 including no visual warning and a second displayed image 350 with a visual warning due to the fault D.

The first displayed image 300 then corresponds to the first acquired image 200 with the addition in superimposition of a first overlay C1 as well as a first symbol 51. The first overlay C1 and/or the first symbol 51 provide the operator with additional information with regard to an estimated absence of fault. The first overlay C1 is e.g. green, and is represented in the form of a cloud of white points in the example shown on a greyscale image on FIG. 6.

The additional information on the absence of any fault is generated by the generation module 48, e.g. when the estimation module 44 has previously estimated such an absence of any fault, and thereby enables the operator to detect, even more rapidly, such an absence of fault. The first symbol 51 is e.g. the value of the level of confidence computed by the estimation module 44, and is typically a value expressed as a percentage, such as 99.99% in the example shown in FIG. 6.

The second displayed image 350 includes two distinct zones, namely a first zone for which an absence of fault has been estimated by the estimation module 44 and then including the first overlay C1 and the first symbol 51; and a second zone distinct from the first zone and including the fault D, according to the corresponding estimation made by the estimation module 44. In the example shown in FIG. 6, a warning corresponding to the second zone is then generated by the generation module 48 during the step 170 and is in the form of the second overlay C2 and/or of the second symbol S2. The second overlay C2 corresponds e.g. to a red overlay, and is represented as white hatching in the example shown in FIG. 6 as a greyscale image, and the second symbol S2 corresponds to a level of confidence expressed in percentage, e.g. 75% in the example shown in FIG. 6.

When the generation module 48 is apt to generate a plurality of warnings, such as first and second warnings associated with first and second predefined thresholds and the warning is a visual warning, the colored overlay associated with the first warning is e.g. orange, and the one associated with the second warning is e.g. red, in order to draw the operator's attention more to the second warning than to the first warning.

In the example shown in FIGS. 7 and 8, the element of the nuclear reactor 1 is a part of a set of fuel assemblies 16 and FIG. 7 represents two acquired images, namely a third acquired image 400 showing no fault, and a fourth image 450 showing a respective fault D. FIG. 8 then shows the images as displayed during the display step 160, namely a third displayed image 500 including no visual warning and a fourth displayed image 550 showing visual warning due to the fault D.

The third and fourth acquired images 400, 450, as visible in FIG. 7, each represent a lateral view of the array of fuel rods 23 and of a respective grid 28 forming spacers for positioning the arrays of fuel rods 23.

The third displayed image 500 then corresponds to the third acquired image 400 with the addition in superimposition of a respective first overlay C1, and of a respective first symbol 51. The first overlay C1 and/or the first symbol 51 provide the operator with additional information with regard to an estimated absence of fault. The first overlay C1 is e.g. green, and is represented in the form of a cloud of white points in the example shown on a greyscale image on FIG. 8. The additional information on the absence of any fault is generated by the generation module 48, e.g. when the estimation module 44 has previously estimated such an absence of any fault, and thereby enables the operator to detect, even more rapidly, such an absence of fault. The first symbol 51 is e.g. the value of the level of confidence computed by the estimation module 44, and is typically a value expressed as a percentage, such as 99.99% in the example shown in FIG. 8.

The fourth displayed image 550 includes two distinct zones, namely a first zone for which an absence of fault has been estimated by the estimation module 44 and then including the first overlay C1 and the first symbol 51; and a second zone distinct from the first zone and including the fault D, according to the corresponding estimation made by the estimation module 44. In the example shown in FIG. 8, a warning corresponding to the second zone is then generated by the generation module 48 during the step 170 and is in the form of the second overlay C2 and/or of the second symbol S2. The second overlay C2 corresponds e.g. to a red overlay, and is represented as white hatching in the example shown in FIG. 8 as a greyscale image, and the second symbol S2 corresponds to a level of confidence expressed as a percentage, e.g. 75% in the example shown in FIG. 8.

The person skilled in the art will understand that the way of presenting the information with regard to the absence or to the estimated presence of a respective fault D, illustrated in FIGS. 6 and 8 with the overlays C1, C2 and/or the symbols 51, S2, is a non-limiting example among other examples of presentation of such information. Of course, other examples of presentation of the information on the absence or the estimated presence of a respective fault D are conceivable.

Thus, the device for assisting with surveillance 40 according to the present disclosure, and the associated method for assisting with surveillance can be used for determining, with a very high precision, the zones of the nuclear reactor 1 which do not have any fault, which is achieved by using the artificial intelligence algorithm for which the learning was performed only with images of said zones without any fault, in order to train the algorithm to provide a level of confidence close to 100% in the absence of any fault and with such precision. In other words, such learning is used for training the artificial intelligence algorithm to recognize healthy zones with a higher level of confidence than would be done by an operator viewing images during the surveillance of nuclear reactors.

Furthermore, such a device for assisting with surveillance 40 remains effective even in the presence of faults not yet identified, the device for assisting with surveillance 40 indicating very quickly to the operator the absence of faults in healthy zones and allowing the operator to focus on the questionable zones by generating for such purpose, a warning associated with the estimation of the presence of fault(s). Thereby, the operator detects easier a fault or faults in such questionable zones.

It is therefore understood that the device for assisting with surveillance 40, and the associated method for assisting with surveillance, are easier to implement, in particular during the training of the artificial intelligence algorithm, while reducing the cognitive load of the operator.

What is claimed is:

1. A method for assisting with surveillance of an element of nuclear reactor, the method being implemented by an electronic device and comprising:

training an artificial intelligence algorithm;

acquiring an image of the element of nuclear reactor;

estimating, from the acquired image and via the artificial intelligence algorithm, the presence of at least one fault of the element;

displaying the image of the element of nuclear reactor; and if at least one fault is estimated to be present, generating a warning;

wherein, during the estimation, an input to the artificial intelligence algorithm is an image of a zone containing the element of the nuclear reactor, and an output of the artificial intelligence algorithm is a level of confidence with regard to an absence of fault of the element for said zone;

wherein if the level of confidence is below a predefined threshold, then at least one fault is estimated to be present; and wherein, during the training, only images of the element without any fault are provided to the input of the artificial intelligence algorithm.

2. The method according to claim 1, wherein the artificial intelligence algorithm includes an artificial neural network.

3. The method according to claim 1, wherein the element of a nuclear reactor is an element of a primary circuit of a nuclear reactor.

4. The method according to claim 3, wherein the element of a nuclear reactor is selected from a group consisting of: a part of a core of a nuclear reactor, a part of a set of fuel assemblies, and a part of a vessel of a nuclear reactor.

5. The method according to claim 1, wherein a first warning is generated if the level of confidence is below a first predefined threshold and/or a second warning is generated if the level of confidence is below a second predefined threshold, the second warning being greater than the first warning, and the second predefined threshold being strictly lower than the first predefined threshold.

6. The method according to claim 1, wherein the acquired image includes a plurality of distinct zones, and during the estimation, a respective level of confidence is estimated for each of said zones.

7. The method according to claim 1, wherein the method further comprises determining the or each predefined threshold, distinct from the training.

8. The method according to claim 7, wherein during the determination, the or each predefined threshold is determined according to at least one level of confidence computed by the artificial intelligence algorithm and for an image of said element with a fault.

9. The method according to claim 1, wherein the warning is a visual warning.

10. The method according to claim 9, wherein the visual warning is in the form of an overlay intended for being displayed superimposed on the image of the element of nuclear reactor.

11. The method according to claim 9, wherein the visual warning is in the form of a symbol intended for being displayed superimposed on the image of the element of nuclear reactor.

12. The method according to claim 1, wherein the warning is an audible warning.

13. A non-transitory computer-readable medium including a computer program including software instructions which, when executed by a computer, implement a method according to claim 1.

14. An electronic device for assisting in surveillance of an element of a nuclear reactor, the device comprising:

a training module configured for training an artificial intelligence algorithm;

an acquisition module configured for acquiring an image of the element of a nuclear reactor;

an estimation module configured for estimating, from the acquired image and via the artificial intelligence algorithm, the presence of at least one fault of the element;

a display module configured for displaying the image of the element of the nuclear reactor;

a generation module configured for generating a warning if at least one fault is estimated to be present;

wherein an input to the artificial intelligence algorithm is an image of a zone containing the element of the nuclear reactor, and an output from the artificial intelligence algorithm is a level of confidence with regard to the absence of any fault of element, for said zone;

wherein the estimation module is configured for estimating that at least one fault is present, if the level of confidence is below a predefined threshold; and wherein the training module is, for training the artificial intelligence algorithm, configured for providing to the input of said artificial intelligence algorithm only images of the element without any fault.

15. An electronic system for assisting in surveillance of an element of a nuclear reactor, the system comprising:

an image sensor configured for taking at least one image of the element of the nuclear reactor; and the electronic device according to claim 14 for assisting with the surveillance of the element of a the nuclear reactor, connected to the image sensor.

\* \* \* \* \*